US007673243B2

(12) United States Patent
Keohane et al.

(10) Patent No.: US 7,673,243 B2
(45) Date of Patent: Mar. 2, 2010

(54) APPARATUS AND METHOD FOR A WEB BROWSER TO SELECT A HOME PAGE UPON ACTIVATION BASED ON A SCHEDULER OR NETWORK CONNECTION

(75) Inventors: Susann Marie Keohane, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 09/965,004

(22) Filed: Sep. 27, 2001

(65) Prior Publication Data

US 2003/0058270 A1 Mar. 27, 2003

(51) Int. Cl.
*G06F 3/00* (2006.01)
(52) U.S. Cl. .................. 715/738; 715/747; 715/745
(58) Field of Classification Search .............. 707/5; 709/219; 345/89, 747, 745; 715/738, 745, 715/747
See application file for complete search history.

(56) References Cited

U.S. PATENT DOCUMENTS 6,052,718 A * 4/2000 Gifford ............... 709/219

| 6,209,036 | B1 * | 3/2001 | Aldred et al. ............... 709/229 |
| 6,675,162 | B1 * | 1/2004 | Russell-Falla et al. .......... 707/5 |
| 6,707,468 | B2 * | 3/2004 | Tange ........................ 715/739 |
| 7,219,162 | B2 * | 5/2007 | Donker et al. ............... 709/245 |

OTHER PUBLICATIONS

University of Maryland's Web Page, Feb. 29, 2000.*

* cited by examiner

*Primary Examiner*—Boris Pesin
(74) *Attorney, Agent, or Firm*—VanLeeuwen & VanLeeuwen; Diana R. Gerhardt (57) ABSTRACT

A method and apparatus for a Web browser to display an alternate home page when a default home page is not presently accessible are provided. The method and apparatus ensures that the default home page is presently accessible before the browser contacts the computer system hosting the home page, when the web browser is first activated. If the default home page is accessible, it is accessed and displayed. If not, an alternate home page is accessed and displayed. In one embodiment of the invention, the invention uses a scheduler (i.e., time and day that the home page may be accessible) to determine whether the home page is presently accessible. In another embodiment, the invention uses IP addresses to determine whether the host computer and the computer used by the user are within the same network. If the two computers are within the same network, then the home page is determined to be presently accessible; otherwise, it is determined to be presently inaccessible.

9 Claims, 12 Drawing Sheets

APPARATUS AND METHOD FOR A WEB BROWSER TO SELECT A HOME PAGE UPON ACTIVATION BASED ON A SCHEDULER OR NETWORK CONNECTION

CROSS-REFERENCE TO RELATED APPLICATIONS

This application is related to co-pending U.S. patent application Ser. No. 09/961,951, entitled APPARATUS AND METHOD OF DISPLAYING BOOKMARKS BASED ON A SCHEDULER OR NETWORK CONNECTION by the inventors herein, Filed on Sep. 24, 2001 and assigned to the common assignee of this application.

BACKGROUND OF THE INVENTION

1. Technical Field

The present invention is directed to a web browser. More specifically, the present invention is directed to an apparatus and method of selecting a home page for a web browser based on a scheduler or network connection.

2. Description of Related Art

As is well known by now, the World Wide Web (WWW) or Internet is a system of servers that support documents formatted in Hyper Text Markup Language (HTML). HTML supports links to documents as well as to graphics, audio and video files. Links are references to documents from within other documents. Links allow a user to easily jump from one document or Web page to another with just a click of a mouse.

To access the Internet one needs to have a Web browser installed. A Web browser is a software application that is used to locate Web sites and display Web pages. When a Web browser is activated for the first time, it usually goes and accesses a default Web page, if one is specified. This default Web page is often referred to as a home page. Sometimes, however, this home page may not be readily accessible.

For instance, as a security measure against Internet intruders, most companies erect firewalls. A firewall allows computer systems that make part of a company's Intranet to freely communicate with each other. These computer systems are euphemistically referred to as being behind the company's firewall. A computer system that is not behind a company's firewall may not freely communicate with computer systems behind the firewall.

Thus, if a computer system (such as a laptop) is behind the company's firewall and the home page is hosted by a computer system that is also behind the firewall, when the Web browser is activated for the first time, the Web browser will be able to access the home page. But, if the computer system accessing the home page is not behind the firewall, the Web browser will not be able to access the home page and an error such as "page cannot be displayed" will be generated.

The "page cannot be displayed" error is not ordinarily generated right after the Web browser starts to run. It usually occurs after a certain amount of time has elapsed (i.e., after the request sent by the Web browser for the home page has timed out). Most users usually wait to see whether a page will be displayed. This is time squandered that could be better used for the task at hand.

Hence, what is needed is a method and apparatus that allow a Web browser to access an alternate home page if the default home page is not presently accessible.

SUMMARY OF THE INVENTION

The present invention provides a method and apparatus for a Web browser to display an alternate home page when a default home page is not presently accessible. When a Web browser is first activated, the invention ensures that the default home page is presently accessible before the browser contacts the computer system hosting the home page. If the default home page is accessible, it is accessed and displayed. If not, an alternate home page is accessed and displayed. In one embodiment of the invention, the invention uses a scheduler (i.e., time and day that the home page may be accessible) to determine whether the home page is presently accessible. In another embodiment, the invention uses IP addresses to determine whether the host computer and the computer used by the user are within the same network. If the two computers are within the same network, then the home page is determined to be presently accessible; otherwise, it is determined to be presently inaccessible.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
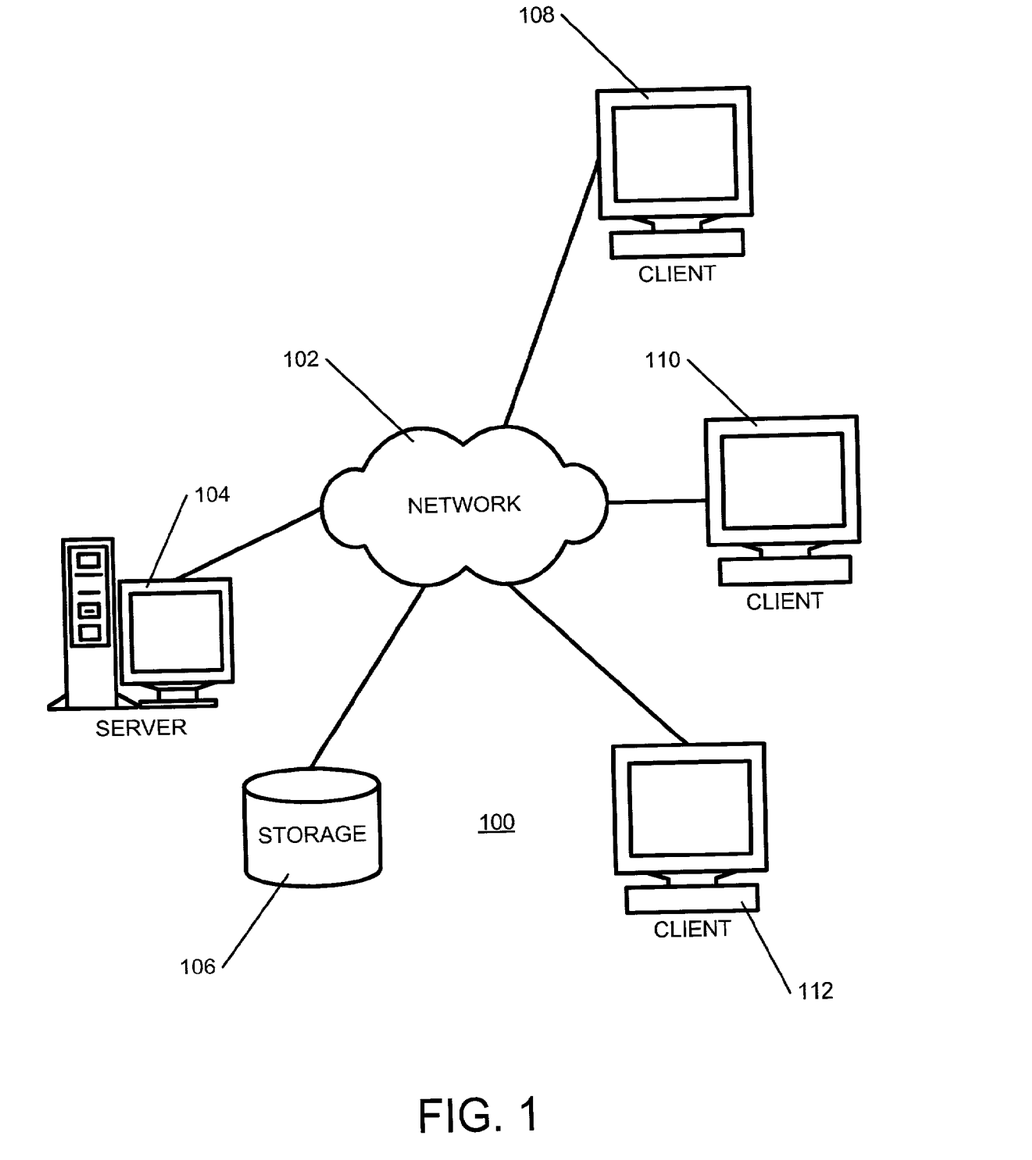
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
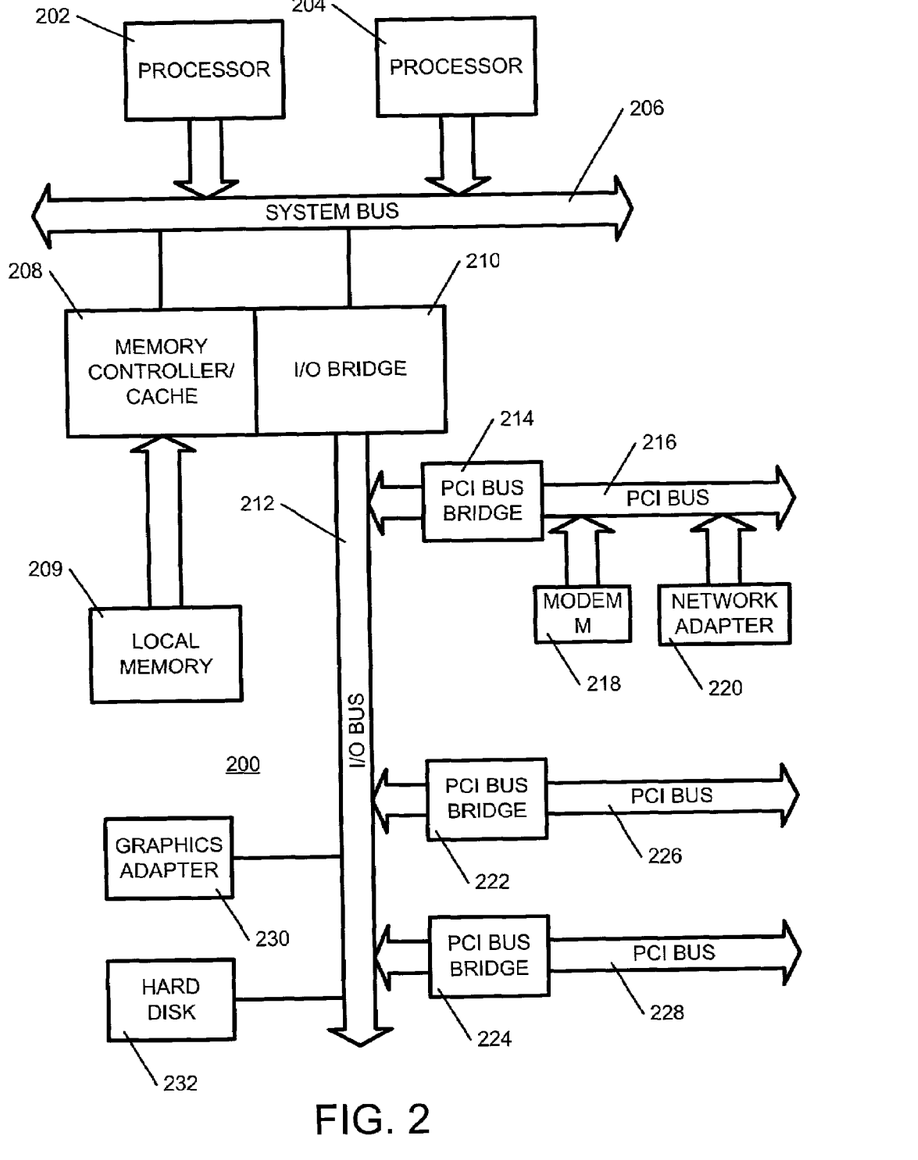
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
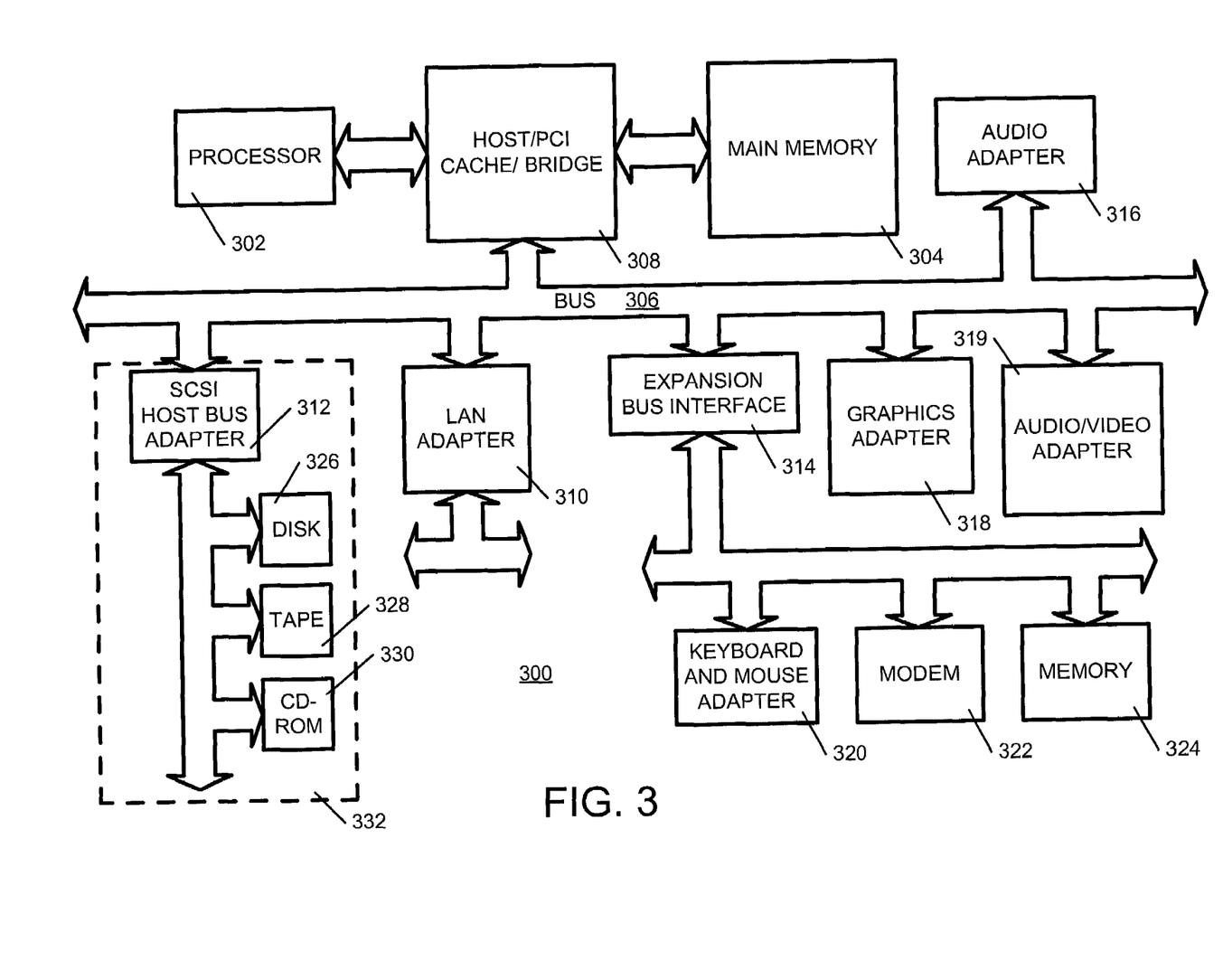
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method that allow a Web browser to display an alternate home page if the default home page is not presently accessible. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

As mentioned earlier, in some instances a home page may not be readily accessible. The invention may use either one of two methods to determine whether a home page is presently accessible. Note that, although the invention uses two methods to determine whether a home page is presently accessible, the invention is not restricted to only these methods, any other method that may be used to determine whether a home page is presently accessible is perfectly within the scope of the invention.

The invention will be described using the two most popular Web browsers, Netscape Navigator and Microsoft's Internet Explorer. Obviously, the application of the invention is not restricted to these browsers. Any browser that supports a home page as an option is well within the scope of the invention.

Figure 4:
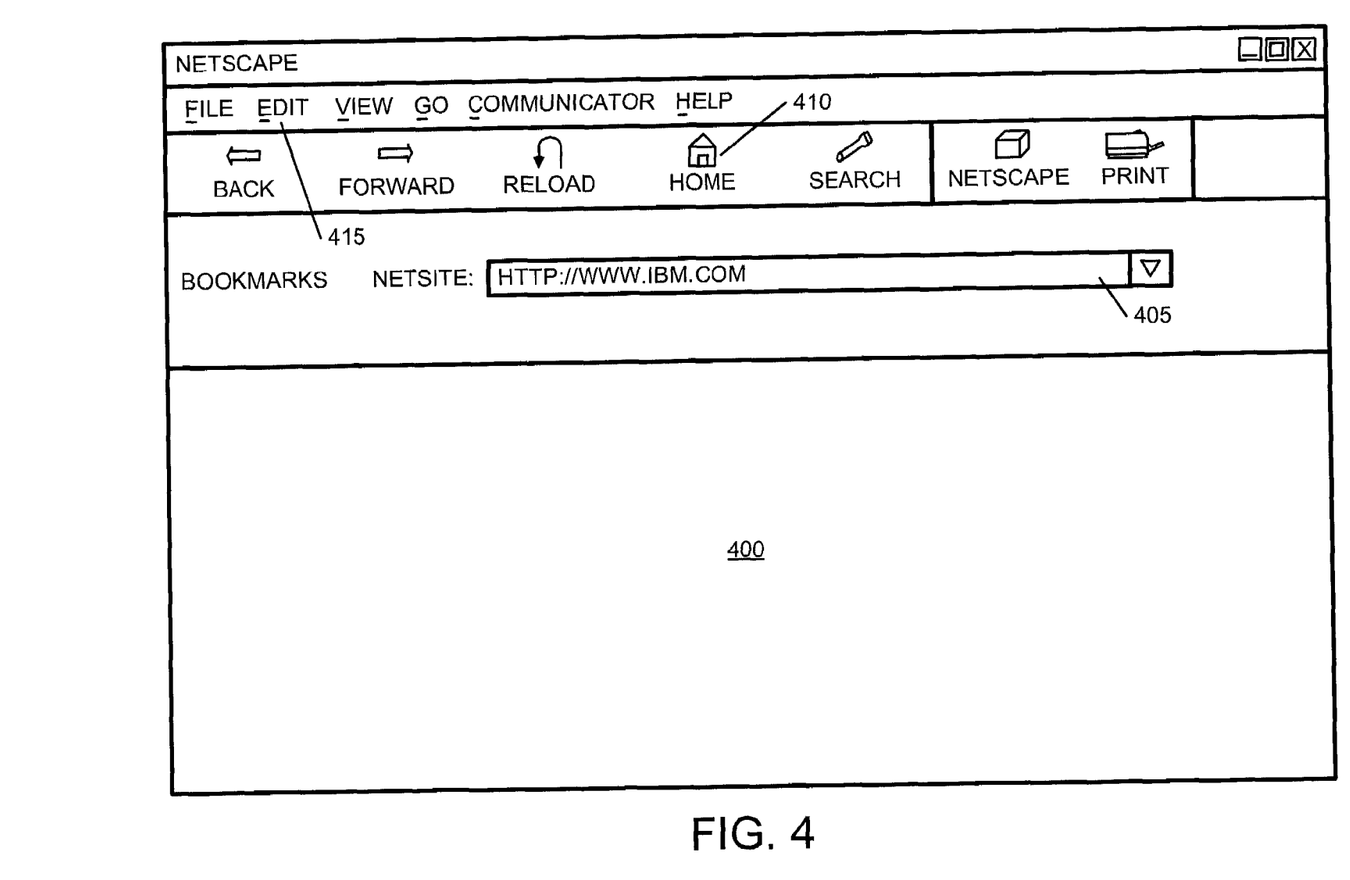
FIG. 4 depicts a display of a Netscape Navigator Web Browser.
Figure 5:
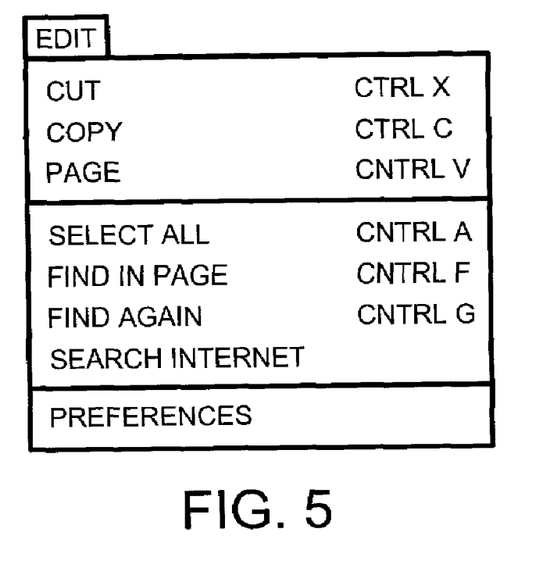
FIG. 5 illustrates Netscape Navigator's Edit pull-down menu.
Figure 6:
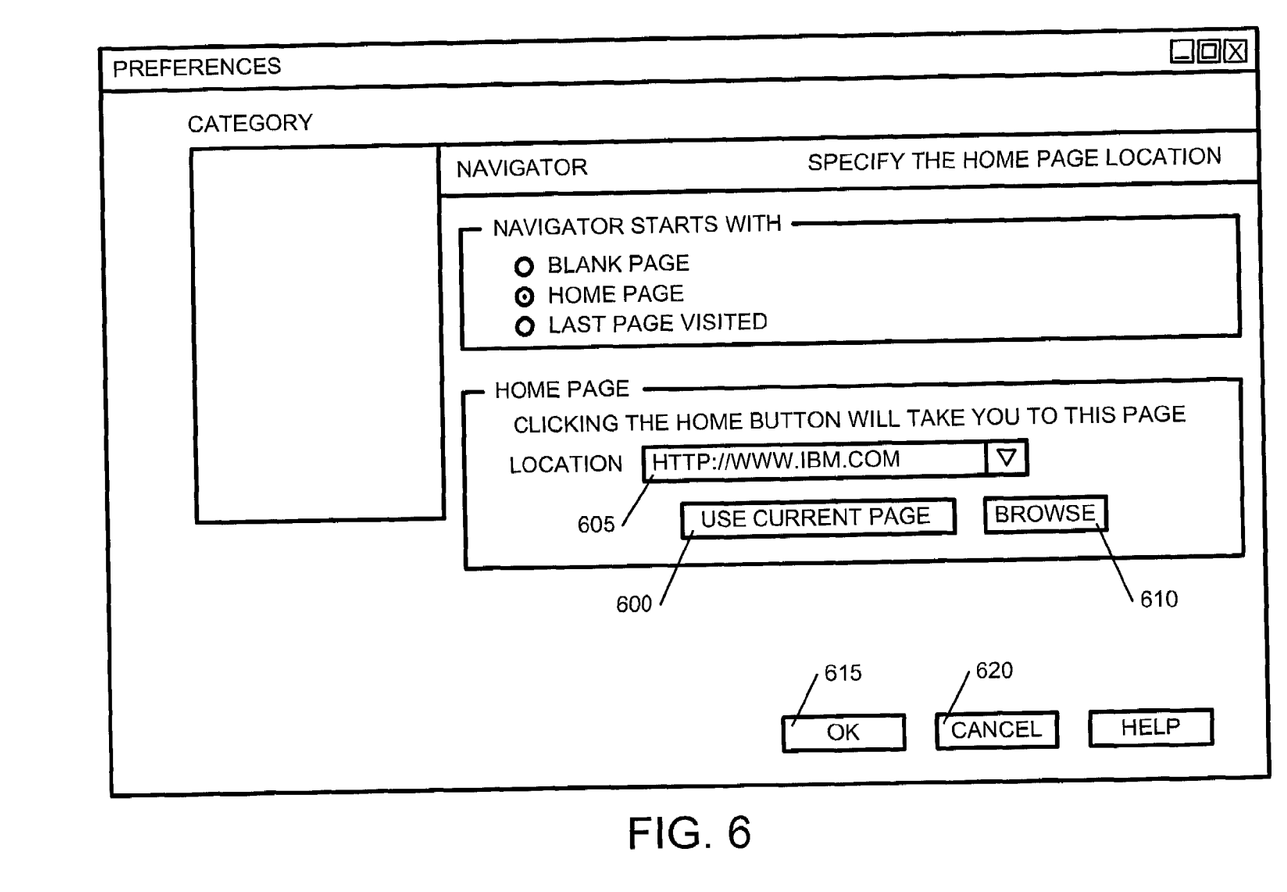
FIG. 6 depicts Netscape Navigator's GUI to change a home page.

FIG. 4 is a graphical user interface (GUI) of an instance of Netscape Navigator. When the web browser is accessed for the first time, the browser automatically accesses and displays the home page in area 400. The Internet address or URL (Uniform Resource Locator) of the home page is displayed in netsite box 405. Web browsers use URLs to locate and display Web pages. In any case, when home icon 410 is asserted, the home page will also be displayed in area 400. To change the home page, a user needs to pull-down the Edit menu 415 and selects "preferences". FIG. 5 illustrates the edit pull-down menu. When "preferences" is selected, FIG. 6 is displayed. Only information pertinent to the invention is given a reference numeral in FIG. 6. In addition, not all the items displayed when "preferences" is selected are shown.

When the user asserts button 600, the URL of the displayed page is entered into location box 605. The displayed page then becomes the home page. The user may also use a URL that exists on the computer system in use as the home page by asserting browse button and asserting the URL from a list of URLs. When finished the user may assert ok button 615 to have the new URL be the home URL or may assert the cancel button 620 to exit without changing the URL or the home page. Furthermore, the user my type in a URL into location box 605 to make the Web page identified by the typed in URL become the home page.

Figure 7:
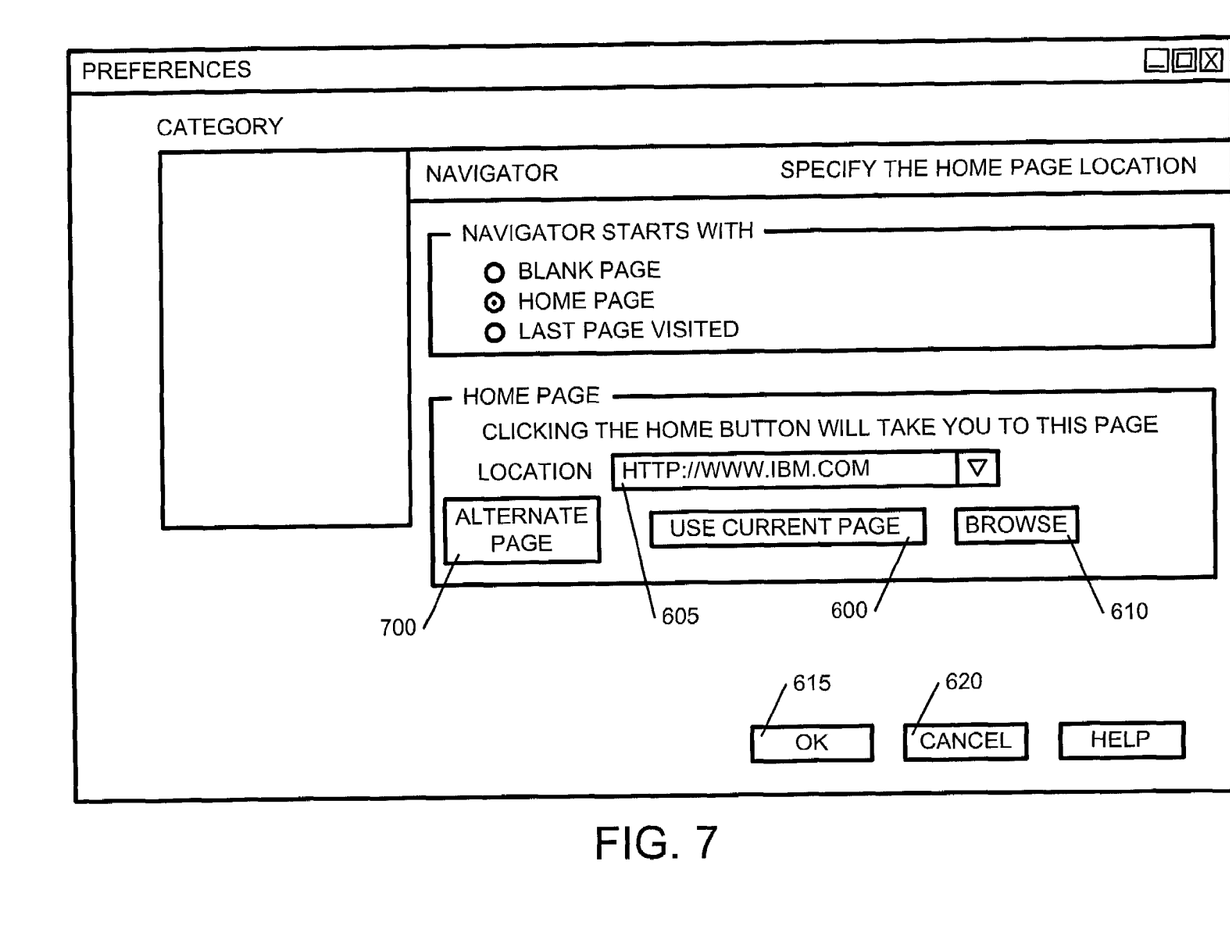
FIG. 7 depicts Netscape Navigator's GUI to change a home page incorporating the present invention.

The present invention proposes to use an alternate page button to ensure that the browser upon initiation retrieves an accessible home page. FIG. 7 displays a GUI with such button. When the user enters a URL in location box 605 and asserts alternate page button 700, a window may pop up requesting that the user enter when this home page is to be accessed. The user may enter "anytime except between Monday to Friday, from eight (8) in the morning to five (5) in the afternoon" when possibly the user may be at work and working behind the firewall. To finalize the change, the user may assert the ok button 615 to have the entry stored. Consequently, when the user activates the browser anytime thereafter, a check of the current day and time is made. If the time falls between the time specified, the default home page will be accessed and displayed. If the day and time fall outside of the specified time, the alternate home page is displayed.

Alternatively, depending on the network connection or the IP (Internet Protocol) address of the computer system the user is currently using, the invention may determine which home page to display. An IP address is an identifier for a computer system or device on a TCP/IP (Transmission Control Protocol/Internet Protocol) network. TCP/IP is a suite of protocols used to connect computer systems on the Internet. Networks using the TCP/IP protocol route messages based on the IP address of the destination system. Thus, each computer system on the Internet has a unique IP address.

The IP address consists of four numbers separated each by a period. Each number may be between zero (0) and 255. For example, 1.160.10.240 may be an IP address. The four numbers are used to identify a particular network and a specific computer system on that network. Thus, each company which has a network (i.e., an Intranet) is assigned a number identifying the network.

Thus, the invention may be designed or the user may specify ahead of time that if the destination computer system (i.e., the computer system that hosts the default home page) is behind a company's firewall (i.e., is part of a company's Intranet) to display the alternate home page unless the computer system in use by the user is also within the company's Intranet. Thus, when the user asserts the alternate page button, a window may pop open requesting that the user confirm that the computer hosting the default home page is behind a firewall. If the user does so confirm, the IP address of the computer system hosting the default home page will be stored in association with the alternate home page. Whenever, the browser is activated, the browser will check to see whether the computer system in use by the user is within the same network as the computer system hosting the home page. If so, the default home page will be accessed and displayed. If not, the alternate home page will be accessed and displayed.

Note that, if the computer system in use by the user does not know its IP address or if it does not know the IP address of the computer system hosting the home page, it can simply use the reverse address resolution protocol (RARP) to find out its own address or request the IP address from the hosting computer. ARP (address resolution protocol) is the protocol used by TCP/IP to convert a physical address into an IP address. A computer system wishing to find out an IP address of another computer system broadcasts an ARP request onto the network or Internet. A computer system on the network that has the IP address responds with its physical address. RARP, on the other hand, is used to obtain a computer system's own IP address. A computer system wishing to find out its own IP address broadcasts its own physical address on the network and the RARP server (the server that assigns IP address to the computer systems in the network) will reply with the computer system's IP address. In the case where the computer system knows the physical address of the hosting computer system (i.e., when knowing the URL of a home page), the computer system may easily request that the hosting computer system provide its IP address. Thus, both IP addresses will be available to the computer system in use by the user.

Figure 8:
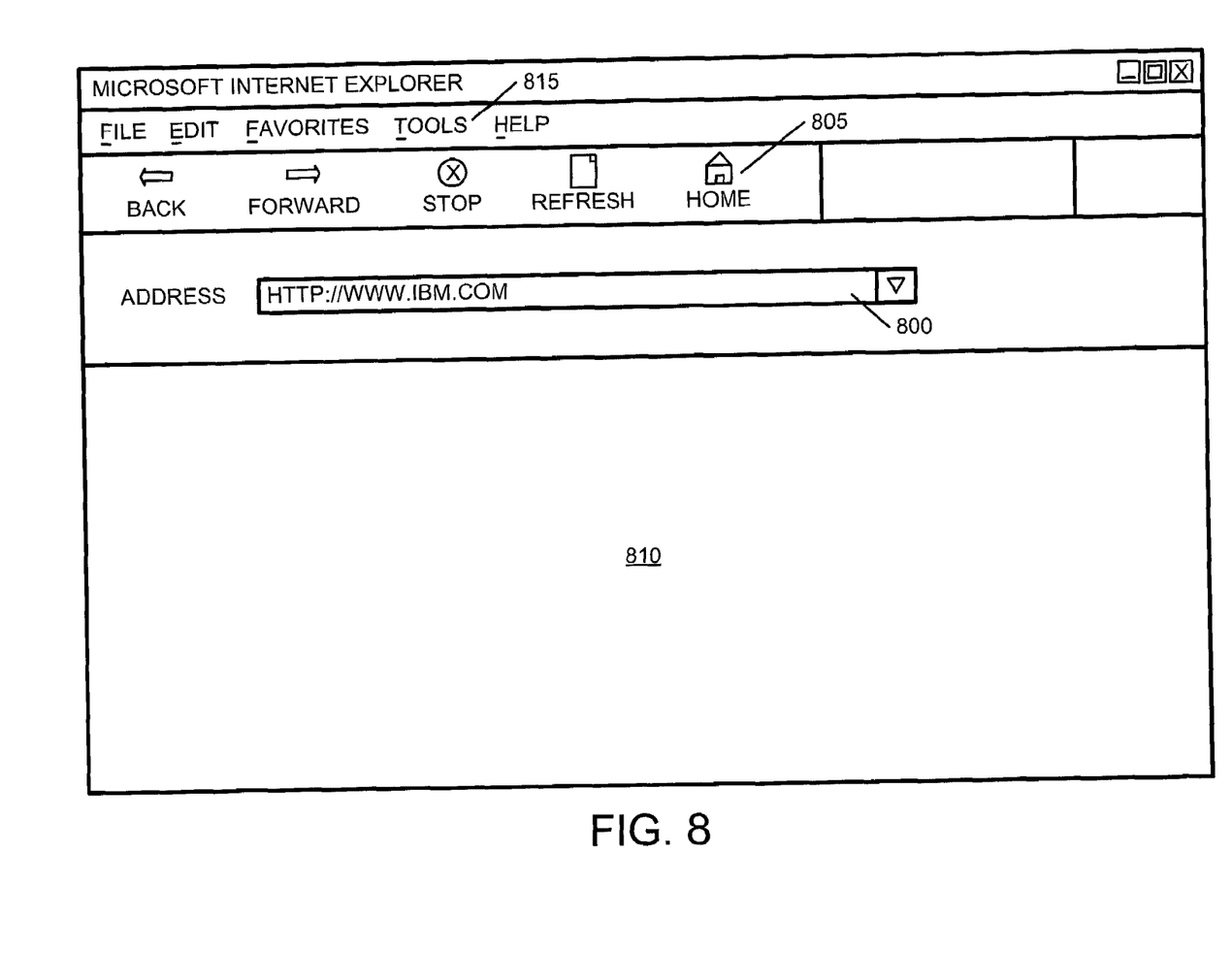
FIG. 8 depicts a display of a Microsoft Internet Explorer Web Browser.
Figure 9:
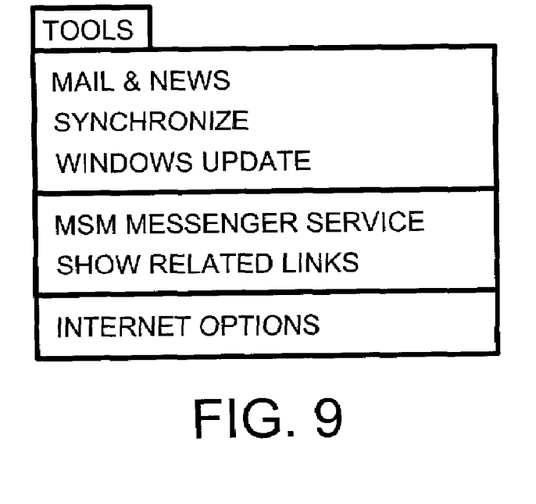
FIG. 9 illustrates Internet Explorer's Tools pull-down menu.

Regarding Microsoft's Internet Explorer, when it is activated, FIG. 8 is displayed. The home page URL is displayed in address box 800 and the home page itself in area 810. Whenever home icon 805 is asserted, the home URL will be displayed in address box 800 and the home page in area 810. To change the home page, a user needs to pull-down the Tools menu 815 and selects "Internet Options". FIG. 9 illustrates the Tools pull-down menu. When "Internet Options" is selected, FIG. 9 is displayed. As before, only information pertinent to the invention is given a reference numeral and not all the items are shown in FIG. 9.

Figure 10:
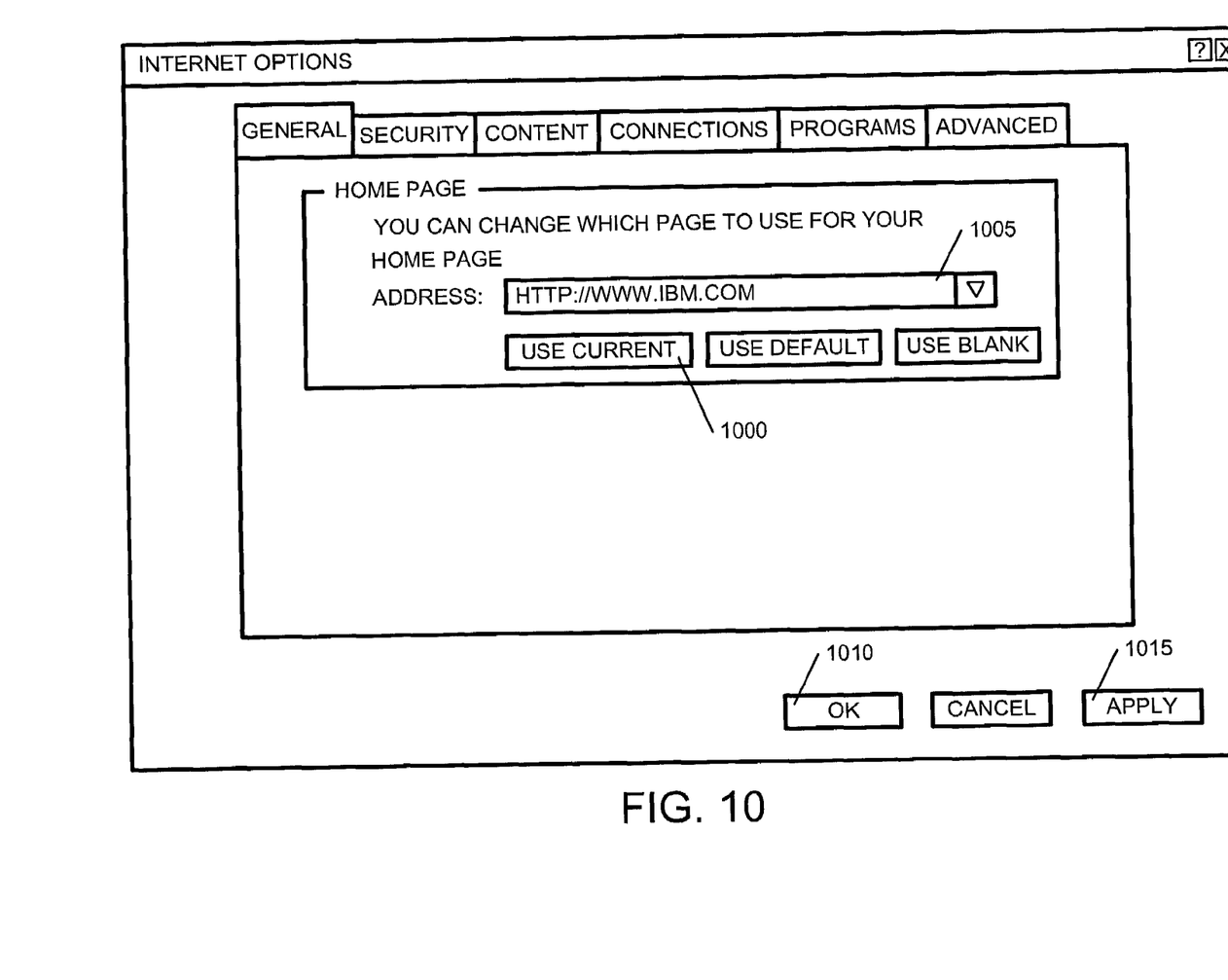
FIG. 10 depicts Internet Explorer's GUI to change a home page.

When the user asserts button 1000, the URL of the displayed page is entered into address box 1005. The user may also type in a URL in address box 1005 and either asserts ok button 1010 or apply button 1015 to make it become a home page URL.

Figure 11:
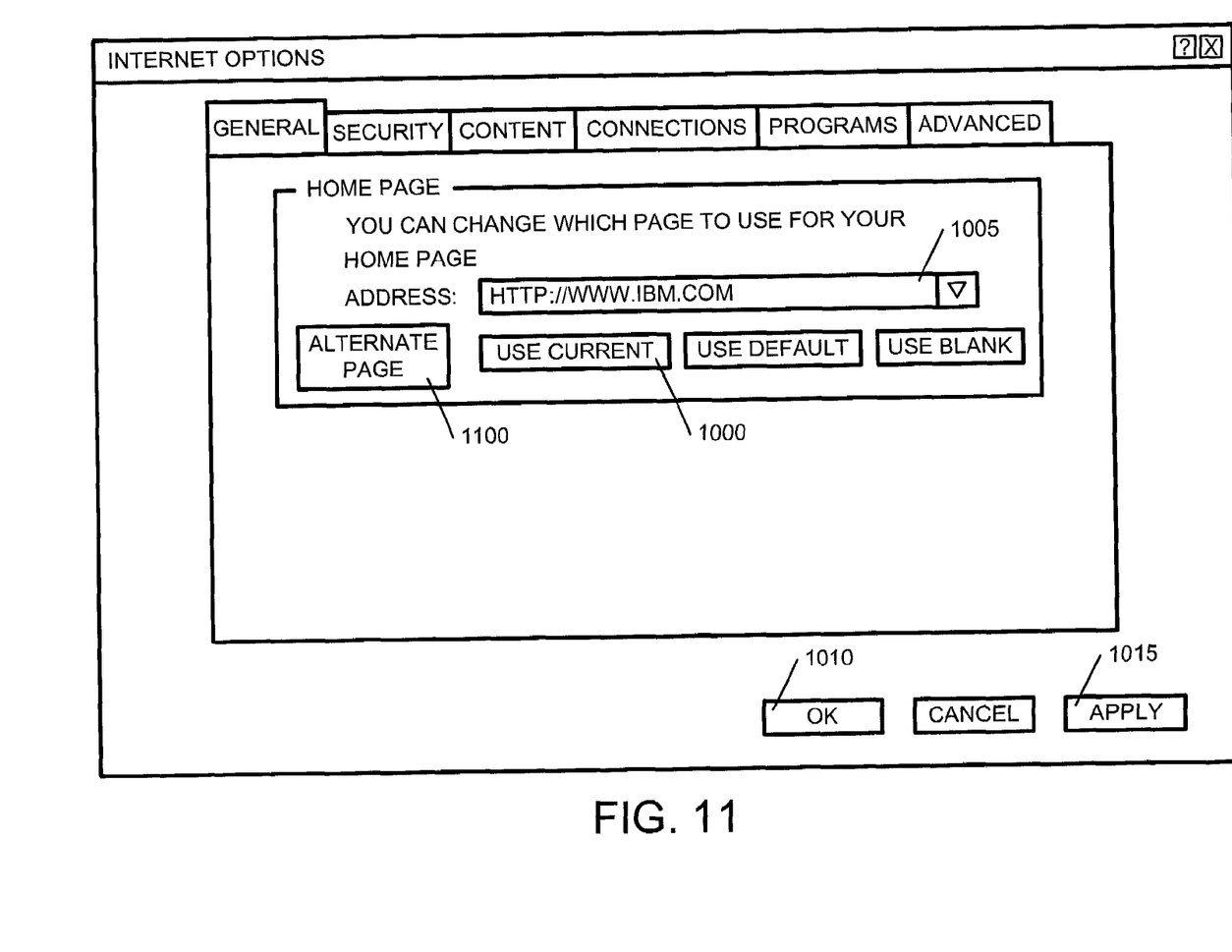
FIG. 11 depicts Internet Explorer's GUI to change a home page incorporating the present invention.

As in the case of Netscape Navigator, an alternate page button may be used to ensure that the browser upon initiation retrieves an accessible home page. FIG. 11 displays a GUI with such button. When the user enters a URL in address box 1005 and asserts alternate page button 1100, a window may pop up requesting that the user enter when this home page is to be accessed. Again, the user may enter "anytime except between Monday to Friday, from eight (8) in the morning to five (5) in the afternoon" when possibly the user may be at work and working behind the firewall. When the user activates the browser anytime thereafter, a check of the current day and time is made. If the time falls between the time specified, the default home page will be accessed and displayed. If the day and time fall outside of the specified time, the alternate home page is displayed.

As before, the IP address of the computer system in use by the user and the computer system hosting the home page may also be used. Again, when the user asserts the alternate page button, a window may pop open requesting that the user confirm that the computer hosting the default home page is behind a firewall. If the user does so confirm, the IP address of the computer system hosting the default home page will be stored in association with the alternate home page. Thereafter, when the browser is activated, the browser will check to see whether the computer system in use by the user is within the same network as the computer system hosting the home page. If so, the default home page will be accessed and displayed. If not, the alternate home page will be accessed and displayed.

Figure 12:
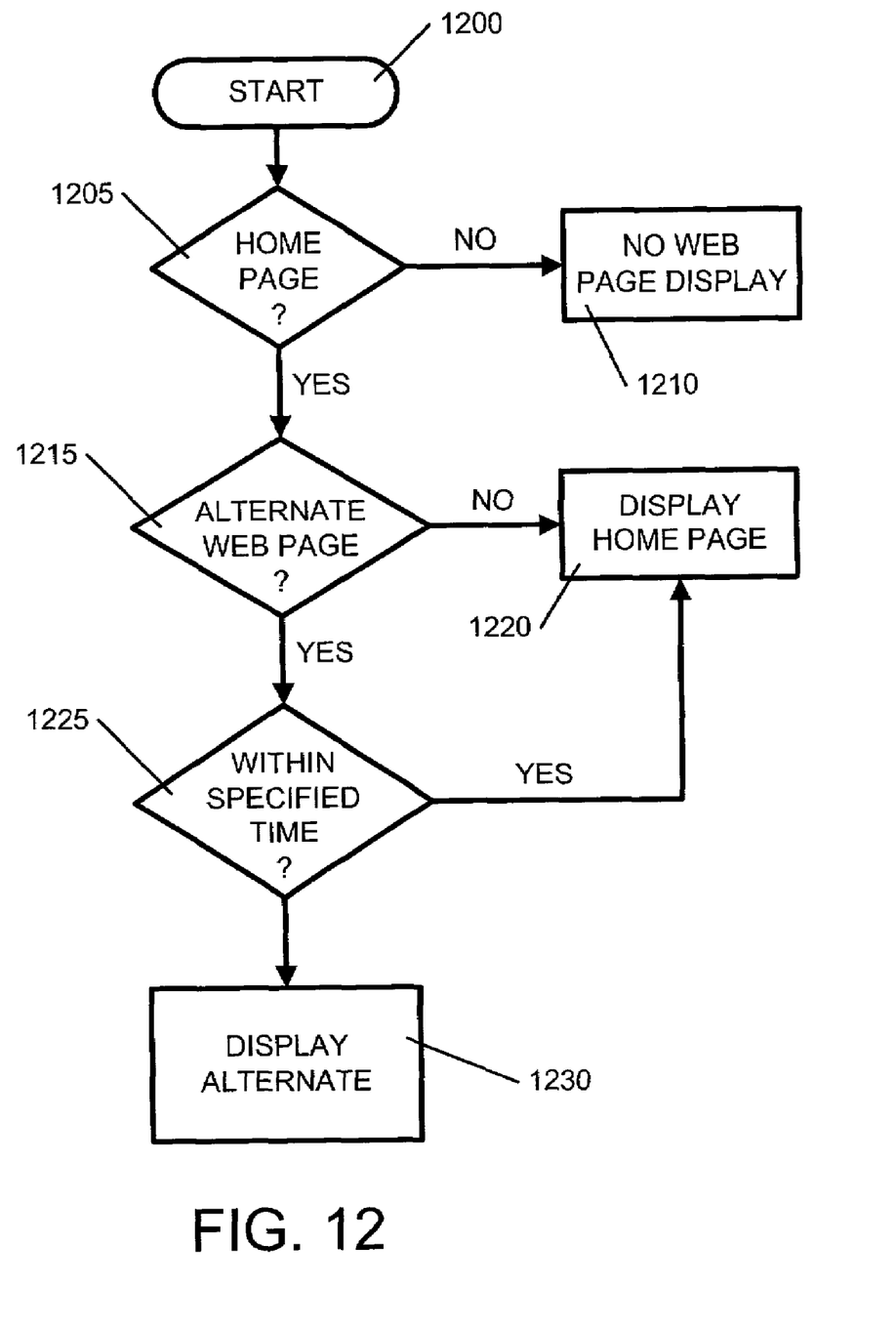
FIG. 12 depicts a flow diagram of a first process used by the present invention.

FIG. 12 is a flow diagram of the invention using the scheduler method. The process starts as soon as the browser, either Internet Explorer or Netscape Navigator, is activated (step 1200). A check is made as to whether there exists a default home page. If not, the browser does not display a Web page (steps 1205 and 1210). If so, a check is made as to whether there is also an alternate home page (steps 1205 and 1215). If not, the browser displays the home page, if it is accessible, else the error message "page cannot be displayed" is generated (step 1220). If there is an alternate home page, a check is made as to whether the current time and day are within the time specified to access and display the home page. If so, the home page is accessed and displayed (steps 1225 and 1220). Note that here, if for some reason the user is not at work when activating the browser regardless as to whether the current time and day are within the specified time, then the "page cannot be displayed" error will probably be generated. If the current time and day are not within the time specified, the alternate home page may be accessed and displayed.

Figure 13:
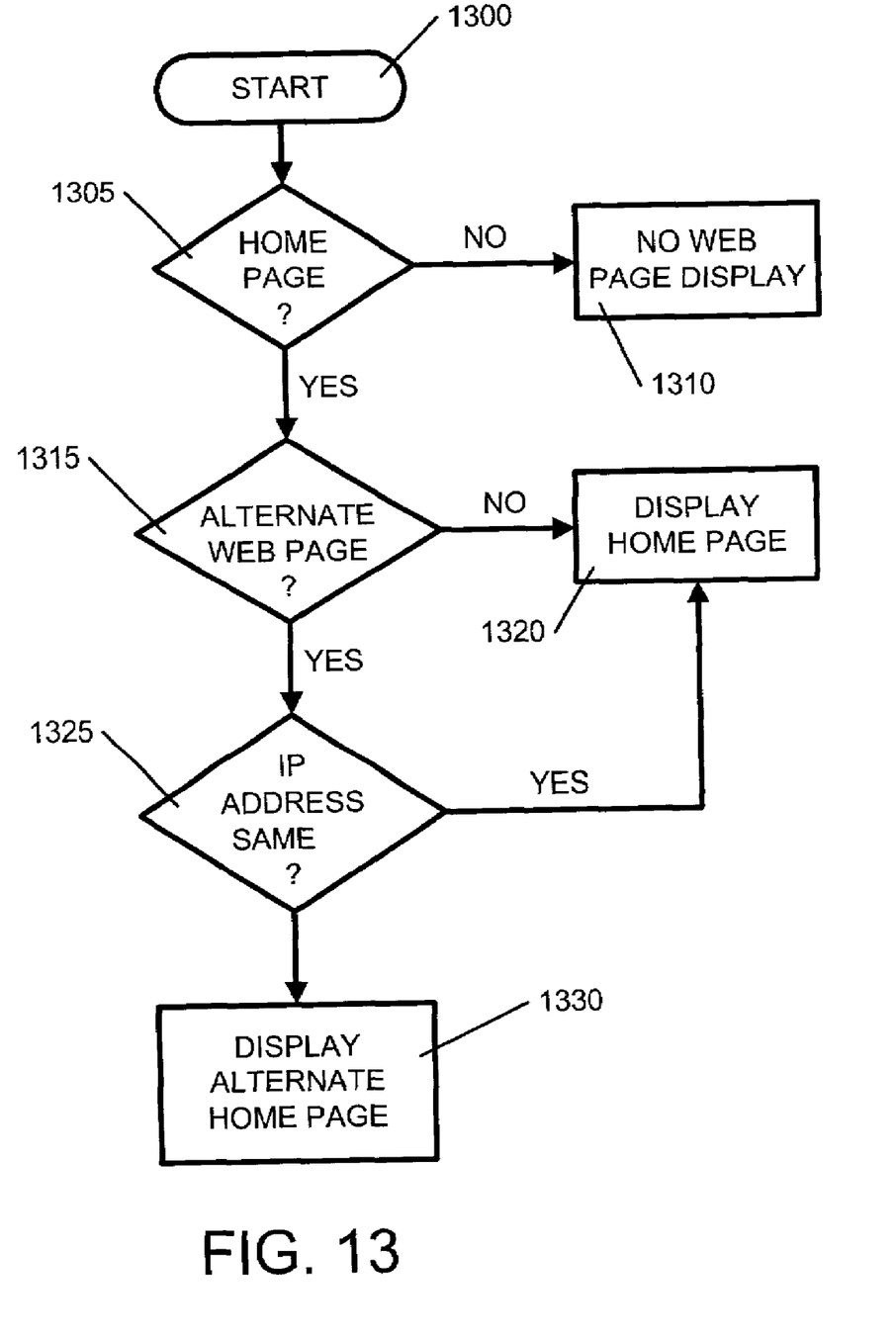
FIG. 13 depicts a flow diagram of a second process used by the present invention.

FIG. 13 is a flow diagram of the invention using the IP address method described above. Again, when either the Netscape Navigator browser or the Internet Explorer browser is activated, the process starts (step 1300). The browser then checks to see whether there is a home page to display. If not, nothing is displayed upon activation (steps 1305 and 1310). If yes, then the browser checks to see whether there is also an alternate home page that may be displayed. If not, then the browser tries to display the home page (steps 1315 and 1320). As mentioned before, if the computer system hosting the home page and the computer system in use by the user are both behind the firewall, the home page will be displayed; otherwise, the "page cannot be displayed" error will be generated after the request times out.

If there is an alternate home page that may be displayed, the browser then checks to see whether both the computer system hosting the home page and the computer system in use by the user are behind the firewall (steps 1315 and 1325). This is done by comparing the IP address of the computer system hosting the home page with the IP address of the user's computer system to see whether they are part of the same network. If they are part of the same network, the home page is displayed (step 1320). If they are not part of the same network, the alternate home page is displayed (step 1330).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for a Web browser to display a home page upon activation comprising the steps of:

determining, by the browser, whether there is indicated in the browser a default home page to display upon activation;

in response to determining that there is indicated in the browser a default home page to display upon activation, determining, by the browser, whether there is also indicated in the browser an alternate home page to display, the alternate home page corresponding to an alternate home page address stored by the browser and being configured to be displayed instead of the default home page based on at least one predetermined condition, wherein said at least one predetermined condition includes determining whether a computer system hosting the default home page is on a different network with a computer system displaying the browser by comparing an Internet protocol (IP) address of the computer system hosting the default home page with an IP address of the computer system displaying the browser;

in response to determining that the at least one predetermined condition is satisfied that indicates that the default home page is inaccessible when there is also indicated in the browser an alternate home page to display, automatically retrieving, by the browser, the alternate home page address and sending a request from the browser to the alternate home page address;

in response to sending the request to the alternate home page address, receiving the alternate home page and displaying the alternate home page; and displaying the default home page in response to determining that the computer system hosting the default home page is on a common network with the computer system displaying the browser based upon the comparison of the Internet protocol (IP) address of the computer system hosting the default home page with the IP address of the computer system displaying the browser.

2. The method of claim 1 wherein said at least one predetermined condition includes determining time and day indicated in a scheduler, located in the browser, that the alternate home page is to be displayed instead of the default home page.

3. The method of claim 2 wherein the default home page is displayed in response to determining that there is not also indicated in the browser an alternate home page to display.

4. A computer program product stored on a data storage medium for displaying a home page upon a browser activation comprising:

code means for determining, by the browser, whether there is indicated in the browser a default home page to display upon activation;

code means, in response to determining that there is indicated in the browser a default home page to display upon activation, for determining, by the browser, whether there is also indicated in the browser an alternate home page to display, the alternate home page corresponding to an alternate home page address stored by the browser and being configured to be displayed instead of the default home page based on at least one predetermined condition, wherein said at least one predetermined condition includes determining whether a computer system hosting the default home page is on a different network with a computer system displaying the browser by comparing an Internet protocol (IP) address of the computer system hosting the default home page with an IP address of the computer system displaying the browser;

in response to determining that the at least one predetermined condition is satisfied that indicates that the default home page is inaccessible when there is also indicated in the browser an alternate home page to display, code means for automatically retrieving, by the browser, the alternate home page address and sending a request from the browser to the alternate home page address;

in response to sending the request to the alternate home page address, code means for receiving the alternate home page and code means for displaying the alternate home page; and code means for displaying the default home page in response to determining that the computer system hosting the default home page is on a common network with the computer system displaying the browser based upon the comparison of the Internet protocol (IP) address of the computer system hosting the default home page with the IP address of the computer system displaying the browser.

5. The computer program product of claim 4 wherein said at least one predetermined condition includes time and day indicated in a scheduler, located in the browser, that the alternate home page is to be displayed instead of the default home page.

6. The computer program product of claim 5 wherein the default home page is displayed in response to determining that there is not also indicated in the browser an alternate home page to display.

7. A computer system for displaying a home page upon a browser activation comprising:
   a storage device for storing code data; and
   a processor for processing the code data in the storage device for performing steps of:
      determining, at the computer system, whether there is indicated in the browser executing at the computer system a default home page to display upon activation;
      in response to determining that there is indicated in the browser a default home page to display upon activation, determining, by the browser, whether there is also indicated in the browser an alternate home page to display, the alternate home page corresponding to an alternate home page address stored at the computer system and being configured to be displayed instead of the default home page based on at least one predetermined condition, wherein said at least one predetermined condition includes determining whether a computer system hosting the default home page is on a different network with a computer system displaying the browser by comparing an Internet protocol (IP) address of the computer system hosting the default home page with an IP address of the computer system displaying the browser;
      in response to determining that the at least one predetermined condition is satisfied that indicates that the default home page is inaccessible when there is also indicated in the browser an alternate home page to display, automatically retrieving, by the browser, the alternate home page address and sending a request from the computer system to the alternate home page address;
      in response to sending the request to the alternate home page address, receiving the alternate home page and display the alternate home page; and
      displaying the default home page in response to determining that the computer system hosting the default home page is on a common network with the computer system displaying the browser based upon the comparison of the Internet protocol (IP) address of the computer system hosting the default home page with the IP address of the computer system displaying the browser.

8. The computer system of claim 7 wherein said at least one predetermined condition includes time and day indicated in a scheduler, located at the computer system, that the alternate home page is to be displayed instead of the default home page.

9. The computer system of claim 8 wherein the default home page is displayed in response to determining that there is not also indicated in the browser an alternate home page to display.

* * * * *